(12) United States Patent
Nishikawa et al.

(10) Patent No.: US 8,413,748 B2
(45) Date of Patent: Apr. 9, 2013

(54) MOTOR-DRIVEN VEHICLE

(75) Inventors: Yutaka Nishikawa, Saitama (JP);
Takeshi Kimishima, Saitama (JP);
Hisashi Matsuo, Saitama (JP); Satoshi Honda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 427 days.

(21) Appl. No.: 12/697,679

(22) Filed: Feb. 1, 2010

(65) Prior Publication Data
US 2010/0243350 A1 Sep. 30, 2010

(30) Foreign Application Priority Data

Mar. 27, 2009 (JP) ................................. 2009-077909
Mar. 27, 2009 (JP) ................................. 2009-077910

(51) Int. Cl.
*B60K 1/00* (2006.01)
(52) U.S. Cl.
USPC ..................................................... 180/65.51
(58) Field of Classification Search ................ 180/65.51; 310/67 A, 67 R
See application file for complete search history.

(56) References Cited

U.S. PATENT DOCUMENTS

| 4,132,281 A | | 1/1979 | Gaddi | |
|---|---|---|---|---|
| 5,150,763 A | * | 9/1992 | Yamashita et al. | 180/65.51 |
| 5,581,136 A | * | 12/1996 | Li | 310/67 R |
| 6,100,615 A | * | 8/2000 | Birkestrand | 180/65.51 |
| 6,276,475 B1 | * | 8/2001 | Nakanosono | 310/67 R |
| 6,278,216 B1 | * | 8/2001 | Li | 310/424 |
| 6,355,996 B1 | * | 3/2002 | Birkestrand | 310/67 A |
| 6,380,731 B1 | * | 4/2002 | Nishimoto | 324/173 |
| 7,017,694 B2 | * | 3/2006 | Shirazawa | 180/65.51 |
| 7,148,582 B2 | * | 12/2006 | Matsueda et al. | 310/67 A |
| 7,195,088 B2 | * | 3/2007 | Matsueda et al. | 180/65.6 |
| 7,472,770 B2 | * | 1/2009 | Tomoshige et al. | 180/65.51 |
| 7,721,835 B2 | * | 5/2010 | Radtke | 180/205.5 |
| 7,870,917 B2 | * | 1/2011 | Akagi et al. | 180/65.51 |
| 8,245,804 B2 | * | 8/2012 | van Rooij | 180/65.51 |
| 2003/0221887 A1 | * | 12/2003 | Hsu | 180/65.6 |

FOREIGN PATENT DOCUMENTS

| DE | 102007006167 A1 | 8/2008 |
|---|---|---|
| JP | 2001-71983 A | 3/2001 |
| NL | 7702229 A | 12/1977 |
| WO | WO 2008/095601 A1 | 8/2008 |

* cited by examiner

*Primary Examiner* — J. Allen Shriver, II
*Assistant Examiner* — James M Dolak
(74) *Attorney, Agent, or Firm* — Birch, Stewart, Kolasch & Birch, LLP

(57) ABSTRACT

A motor-driven vehicle capable of increasing the degree of freedom of wiring for a motor. A drive wheel having a motor with a stator and a rotor serving as a drive source disposed in a wheel hub is rotatably supported on a wheel shaft between right and left forks. The stator is provided in a body-side retainer member fixed to a vehicle body, the rotor is rotatably supported on the wheel shaft, and wiring for the motor is passed through the body-side retainer member. The brake mechanism is provided on the drive wheel. As seen from a front of a vehicle body, the wheel hub is rotatably supported on the wheel shaft on one lateral side alone from a body center and the brake mechanism is disposed on one lateral side from a body center and the motor is disposed on the other lateral side from the body center.

20 Claims, 4 Drawing Sheets

MOTOR-DRIVEN VEHICLE

CROSS-REFERENCE TO RELATED APPLICATIONS

The present application claims priority under 35 USC 119 to Japanese Patent Application No. 2009-077909 filed on Mar. 27, 2009 and Japanese Patent Application No. 2009-077910 filed on Mar. 27, 2009 the entire contents of which are hereby incorporated by reference.

BACKGROUND OF THE INVENTION

1. Field of the Invention

The present invention relates to a motor-driven vehicle.

2. Description of Background Art

As set forth in JP-A No. 2001-071983, in a conventional motor-driven vehicle, a wheel rotatably mounted on wheel shafts (6) and (21) between front forks (2) is equipped with a motor (3) inside a wheel hub (5). A stator (8) of the motor (3) is fixed to body-side retainer members (13 and 15) which are fixed on a body side. Rotational power of a rotor (11) provided inside the stator (8) is transmitted to the wheel hub (5) through a planetary reducer (4). The wheel hub (5) is rotatably supported on a perimeter of the body-side retainer member (13) through a bearing (43). Wiring (refer to 55) for the motor (3) is carried out by being inserted into the body-side retainer members (13 and 15).

In the conventional motor-driven vehicle described above, the wheel hub (5) is rotatably supported by the perimeter of the body-side retainer member (13) through the bearing (43). Therefore, the wiring (refer to 55) for the motor (3) can be carried out only by being passed through a portion located inside the bearing (43) which is on the fixed side. For this reason, the degree of freedom of wiring is greatly restricted. Moreover, in order to increase the size of a space through which the wiring can be passed, it is necessary to make a diameter of the bearing (43) larger, thus increasing the cost thereof. When a bearing for exclusive use is required, it will further increase the cost.

As set forth in JP-A No. 2001-071983, the wheel hub (5) is formed as a rotating body between the front forks (2) across the right and left sides. The motor (3) is disposed at a center between the right and left front forks (2).

In the conventional motor-driven vehicle described above, since regenerative braking by the motor was available, a brake mechanism was not necessarily provided. As a result, the motor could be installed at the center between the right and left front forks to achieve favorable right and left weight balance.

However, when trying to provide the brake mechanism, if the motor is arranged at the center between the front forks, the weight is biased to the side where the brake mechanism is provided.

SUMMARY AND OBJECTS OF THE INVENTION

An object of an embodiment of the present invention is to address the above problem, and to provide a motor-driven vehicle which can raise the degree of freedom of wiring for a motor.

In order to achieve the above object, according to an embodiment of a motor-driven vehicle of the present invention, a drive wheel having a motor with a stator and a rotor serving as a drive source disposed in a wheel hub is rotatably supported on a wheel shaft between right and left forks. The stator is provided in the body-side retainer member fixed to a vehicle body. The rotor is rotatably supported on the wheel shaft. Further, the wiring for the motor is passed through the body-side retainer member.

As seen from a front of the vehicle body, the wheel hub is rotatably supported on the wheel shaft on one lateral side alone from the body center.

According to the motor-driven vehicle, since the wheel hub is rotatably supported on the wheel shaft on the one lateral side alone from the body center, the wheel hub does not have to be rotatably supported relative to the body-side retainer member.

Therefore, the degree of freedom of the form of the body-side retainer member is increased. As a result, the space through which the wiring for the motor is passed can be larger, raising the degree of freedom of the wiring.

Desirably, on the wheel hub, around the wheel shaft, an annular end part opened to the other lateral side with respect to the one lateral side is provided on an outer periphery of the perimeter of the rotor of the motor.

The body-side retainer member is provided on the other lateral side. On the body-side retainer member, around the wheel shaft, an annular end part opened to the one lateral side is provided on the outer periphery of a perimeter of the rotor of the motor.

The annular end part of the wheel hub and the annular end part of the body-side retainer member are overlapped in an axial direction of the wheel shaft. In an overlapped portion, there is provided a seal between the wheel hub and the body-side retainer member.

With this structure, the annular end part of the wheel hub and the annular end part of the body-side retainer member are overlapped in the axial direction of the wheel shaft, and the seal is provided between the wheel hub and the body-side retaining member in the overlapped portion. Therefore, even if the wheel hub is not rotatably supported relative to the body-side retainer member, the motor can be protected by the wheel hub and the body-side retainer member.

Further, the rotor of the motor is desirably coupled to the wheel hub through a one-way clutch.

With this structure, when the rotation (vehicle speed) of the drive wheel is faster than the rotation of the motor, the rotation of the wheel hub becomes faster than the rotation of the motor. Therefore, the motor does not become a load, and a braking force can be applied to rotation of the motor at the time of braking.

Furthermore, desirably, a power transmission member is coupled to the rotor, and the one-way clutch is provided in an outer peripheral portion of the power transmission member between the wheel hub and the power transmission member.

With this structure, relative to the axial direction of the wheel shaft, an interlocking mechanism of the rotor and the wheel hub can be compactly structured.

Moreover, desirably, in the portion other than the portion overlapped with the wheel hub in the body-side retainer member, the wiring is passed through the body-side retainer member.

With this structure, a wiring insertion part can be easily sealed.

Moreover, it is desirably that the wiring is passed through the body-side retainer member behind the front fork and is arranged along the front fork.

With this structure, the wiring can easily be protected by the front fork, preventing the wiring from being broken.

An object of an embodiment of the present invention is to address the above problem and to provide a motor-driven vehicle achieving a favorable right and left weight balance in the case where a brake mechanism is installed.

In order to achieve the above object, according to the motor-driven vehicle of an embodiment of the present invention, a drive wheel having a motor with a stator and a rotor serving as a drive source disposed in a wheel hub is rotatably supported on a wheel shaft between right and left forks.

A brake mechanism is provided on the drive wheel. As seen from a front of a vehicle body, the brake mechanism is arranged on one lateral side from a body center, and the motor is arranged on the other lateral side from the body center.

In the motor-driven vehicle, as seen from the front of the vehicle body, the brake mechanism is arranged on one lateral side from the body center, and the motor is arranged on the other lateral side from the body center. Therefore, even though the brake mechanism is provided on the drive wheel, the weight balance between the right and left of the vehicle can be made favorable.

Desirably, as seen from the front of the vehicle body, the brake mechanism is arranged between the front forks on one lateral side from the body center, and the motor is arranged between the front forks on the other lateral side from the body center.

With this structure, there is provided a favorable weight balance about the front forks rotatably steered by a driver, improving the operability.

Further, desirably, the wheel hub is rotatably supported on the wheel shaft on the one lateral side. On the wheel hub, an annular end part opened to the other lateral side is provided on an outer periphery of a perimeter of the rotor of the motor around the wheel shaft.

On the other lateral side, a body-side retainer member which is fixed to the vehicle body and to which the stator of the motor is fixed is provided. On the body-side retainer member, around the wheel shaft, an annular end part opened to the one lateral side is provided on the outer periphery of the perimeter of the rotor of the motor.

The annular end part of the wheel hub extends to the other lateral side across the body center, and is allowed to be overlapped with the annular end part of the body-side retainer member in an axial direction of the wheel shaft.

With this structure, the wheel hub is rotatably supported on the wheel shaft on the one lateral side and the body-side retainer member to which the stator of the motor is fixed is provided on the other lateral side. Therefore, it becomes easier to arrange the brake mechanism on one lateral side from the body center and to arrange the motor on the other lateral side from the body center.

Also, on the wheel hub, around the wheel shaft, there is provided the annular end part opened to the other lateral side on the outer periphery of the perimeter of the rotor of the motor. On the body-side retainer member, there is provided an annular end part opened to the one lateral side on the outer periphery of the perimeter of the rotor of the motor about the wheel shaft. The annular end part of the wheel hub extends to the other lateral side across the body center. Further, the annular end part overlaps the annular end part of the body-side retainer member in the axial direction of the wheel shaft. Therefore, even though the wheel hub is provided on one lateral side and the body-side retainer member is provided on the other lateral side, the motor can be protected by the wheel hub and the body-side retainer member.

Desirably, the brake mechanism is disposed closer to the wheel hub, and the motor is disposed closer to the body-side retainer member.

With this structure, it becomes easier to arrange the brake mechanism on the one lateral side from the body center and to arrange the motor on the other lateral side from the body center. At the same time, it becomes possible to shorten the distance between the brake mechanism and the wheel hub.

Desirably, the rotor of the motor is coupled to the wheel hub through a one-way clutch.

With this structure, when the rotation of the driven wheel (vehicle speed) is faster than the rotation of the motor, the rotation of the wheel hub becomes faster than the rotation of the motor. Therefore, the motor does not become a load, and a braking force can be applied to the rotation of the motor during braking.

Also, desirably, the rotor is coupled to the power transmission member supported rotatably on the wheel shaft. Thus, the rotor is rotatably supported on the wheel shaft. Further, there is provided the one-way clutch in the outer peripheral portion of the power transmission member between the power transmission member and the wheel hub.

With this structure, an interlocking mechanism of the rotor and the wheel hub can be made compact with respect to the axial direction of the wheel shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, with reference to the drawings, embodiments of the motor-driven vehicle of the present invention will be described.

Figure 1:
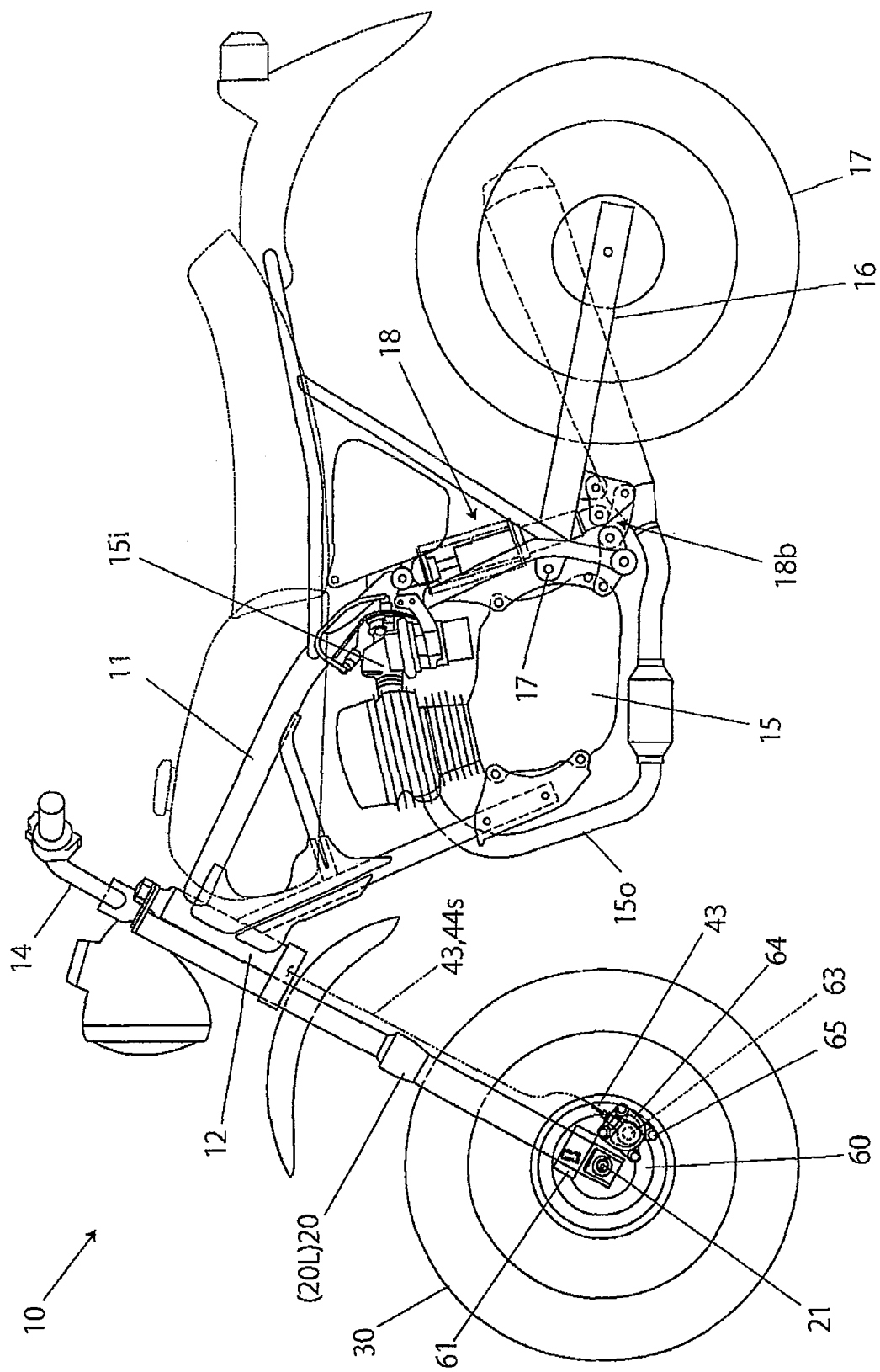
FIG. 1 is a side view showing one embodiment of a motor-driven vehicle according to the present invention.
Figure 2:
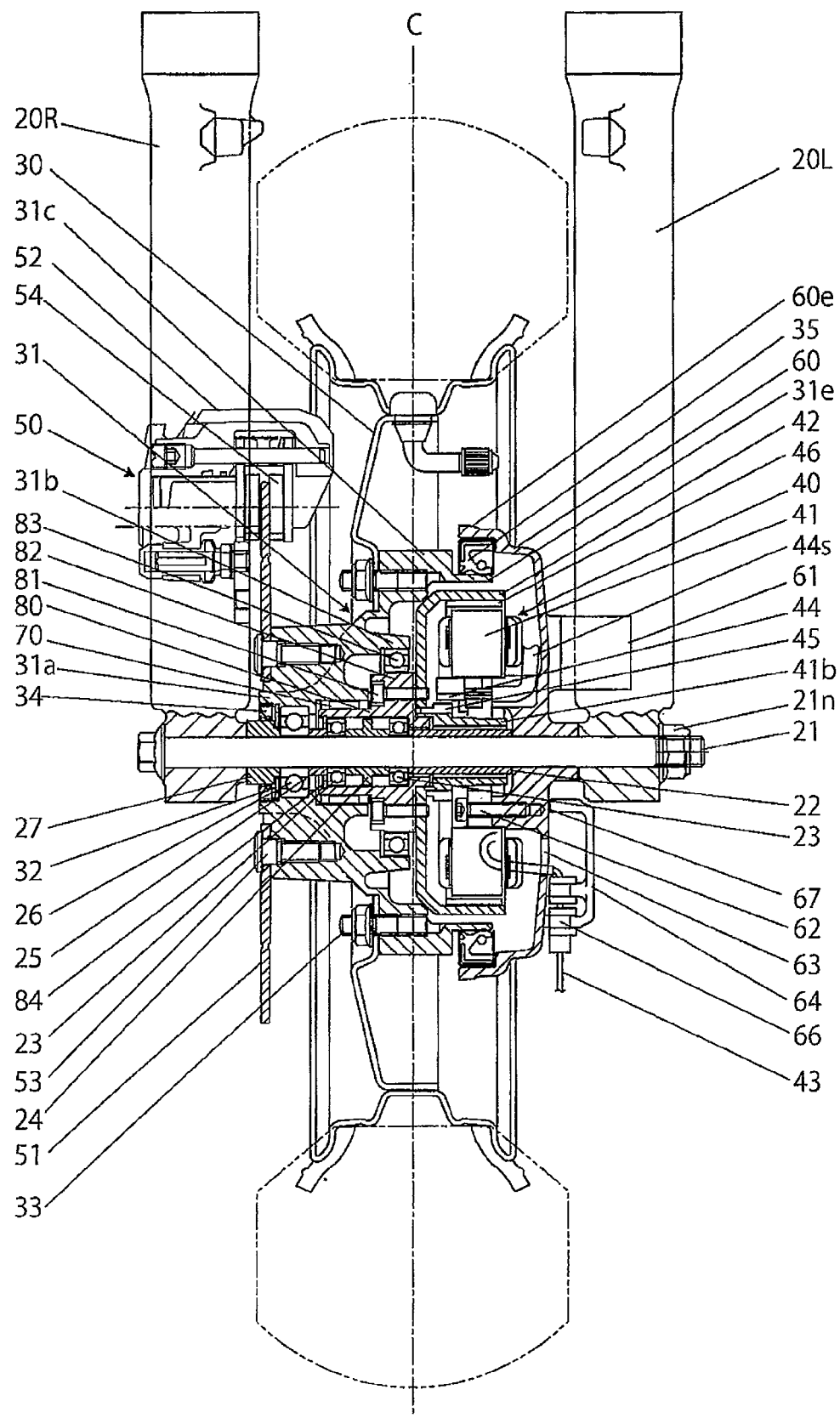
FIG. 2 is a front sectional view showing a principal part.

FIG. 1 is a side view showing one embodiment of the motor-driven vehicle according to the present invention, and FIG. 2 is a front sectional view showing a principal part.

The motor-driven vehicle 10 of the present embodiment is a motorcycle, and has a frame 11 which constitutes a vehicle body. Front forks 20 are attached to a head pipe 12 which constitutes a front end of the frame 11 such that it can be freely steered. A handle bar 14 is attached to upper parts of the front forks 20 with a front wheel 30 being mounted on lower ends of the front forks 20. An engine 15 is fixed inside the frame 11. An intake device 15*i* and an exhaust device 15*o* are connected to the engine 15. A pair of right and left swing arms 16 is attached to a rear end of the frame 11 in a freely and vertically swinging manner on a pivot shaft 17. A rear wheel 17 is mounted on rear ends of the swing arms 16. The rear wheel 17 is driven through drive transmission means such as a chain and a drive shaft not show) by the engine 15. A rear shock absorber 18 is provided. An upper end of the unit is coupled to a rear upper part of the frame 11. A lower end of the unit is coupled a lower part of the swing arm 16 and a rear lower part of the body frame 11 through a link mechanism 18b.

In addition to the rear wheel 17, in this motorcycle, the front wheel 30 also serves as a drive wheel. Moreover, a braking device is provided for the front wheel 30. Since the front wheel 30 is driven by a motor built in the front wheel 30, a basic structure of its drive system will be explained first. At the same time, an overall structure of the braking device of the front wheel 30 will be explained.

In FIG. 2, a motor 40 includes a stator 41 and a rotor 42, and serves as a drive source for the front wheel 30. The front wheel 30 is rotatably supported on a wheel shaft 21 between the left and right forks, left and right front forks 20L and 20R in this case. The motor 40 is provided in the wheel hub 31 of the front wheel 30.

A brake mechanism 50 is provided on a drive wheel 30. As shown in FIG. 2, as seen from the front of the vehicle body, the brake mechanism 50 is arranged on one lateral side (left-hand side in FIG. 2) from a body center C, which is midway between the front forks 20L and 20R. On the other hand, the motor 40 is arranged on the other lateral side (right-hand side in FIG. 2) from the body center C. Moreover, according to the present embodiment, as seen from the front of the vehicle body, the brake assembly 50, in particular, a braking part 52 for producing a braking force to be described later and a part 51 to be braked for receiving the braking force are arranged on one lateral side from the body center C midway between the front forks 20L and 20R. The motor 40 is arranged on the other lateral side from the body center C midway between the front forks 20L and 20R.

The wheel hub 31 is rotatably supported on the wheel shaft 21 on the one lateral side alone. On the wheel hub 31, there is provided an annular end part 31e opened to the other lateral side on an outer periphery of the perimeter of the rotor 42 of the motor 40 around the wheel shaft 21.

On the other hand, on the other lateral side, there is provided a body-side retainer member 60 fixed to the front fork 20L which constitutes part of the vehicle body and to which the stator 41 of the motor 40 is fixed. On the body-side retainer member 60, there is provided an annular end part 60e opened to the one lateral side on the outer periphery of the perimeter of the rotor 42 of the motor 40 around the wheel shaft 21.

The annular end part 31e of the wheel hub 31 extends across the body center C to the other lateral side, and overlaps the annular end part 60e of the body-side retainer member 60 in the axial direction (right and left direction in FIG. 2) of the wheel shaft 21.

The brake mechanism 50 is disposed closer to the wheel hub 31, and the motor 40 is disposed closer to the body-side retainer member 60.

The rotor 42 of the motor 40 is coupled to the wheel hub 31 through a one-way clutch 70. The rotor 42 is rotatably supported on the wheel shaft 21 by being coupled to a power transmission member 80 rotatably supported on the wheel shaft 21. In an outer peripheral portion of the power transmission member 80, the one-way clutch 70 is provided between the power transmission member 80 and the wheel hub 31.

Now, each component will be explained one by one.

The wheel shaft 21 comprises axle bolts and is secured at top ends of front forks 20L and 20R with axle nuts 21n.

On the wheel shaft 21, there are mounted, from the right-hand side in FIG. 2, the body-side retainer member 60, an axle collar 22, a ball bearing 23, a distance collar 24, a ball bearing 23, a wheel distance collar 25, a ball bearing 26, and a side collar 27. They are fastened together and fixed by the axle nuts 21n between the front forks 20L and 20R.

A convex part 61 is integrally formed on an outer side face of the body-side retainer member 60. When the convex part 61 engages with the front fork 20L, rotation of the body-side retainer member 60 about the wheel shaft 21 is reliably prevented.

In the body-side retainer member 60, the stator 41 of the motor 40 is fixed with socket bolts 62.

In FIGS. 1 and 2, an electric wire 43 of the motor 40 is provided. In the body-side retainer member 60, a hole 63 is made for pulling the electric wire 43 out of the body-side retainer member 60. The electric wire 43 pulled out of the hole 63 is supported by a cover 64 through a grommet 66, and is connected to a battery not shown for the motor which is a power source. The battery is mounted on the body frame 11. For the purpose of closing the hole 63, the cover 64 is fixed to the outer face of the body-side retainer member 60 with bolts 65 in FIG. 1. A gasket 67 is provided between the cover 64 and the outer face of the body-side retainer member 60. Inside of the cover 64 is kept airtight by the gasket 67 and the grommet 66. Therefore, water or the like is less likely to enter through the hole 63 into the interior of the body-side retainer member 60.

In the body-side retainer member 60, a magnetic sensor 44 is provided inside the stator 41. When the magnetic sensor 44 detects a magnet 45 provided in the rotor 42, rotation of the rotor 42 is detected. Its signal wire 44s is also pulled out as in the case of the electric wire 43, and is connected to a control unit of the motorcycle.

In addition, in FIG. 2, the electric wire 43 is pulled out downward. This is because a cross section in FIG. 1 is extended and shown. In reality, as shown in FIG. 1, the electric wire is pulled out upward, and the same holds true of the signal wire 44s.

The wiring (the electric wire 43 and the signal wire 44s) for the motor 40 can be passed through the body-side retainer member 60 in a portion other than the portion overlapped with the wheel hub 31. According to the present embodiment, as shown in FIG. 1, behind the front fork 20L, the wiring is passed through the hole 63 of the body-side retainer member 60 and is laid along the front fork 20L. The electric wire 43 and the signal wire 44s are connected to the control unit not shown mounted at an appropriate position of the body frame 11.

As shown in FIG. 2, the rotor 42 of the motor 40 has a cross section generally in the shape of U. A magnet 46 is provided on an inner circumference which is opposed to the stator 41. The central part of the rotor 42 is fixed to a flange part 82 of the power transmission member 80 with socket bolts 81. The power transmission member 80 is rotatably supported on the wheel shaft 21 through the ball bearings 23 and 23. Therefore, the rotor 42 is rotatably supported on the wheel shaft 21 through the power transmission member 80 and the ball bearings 23. A cylindrical part 41b which enters the central part of the stator 41 is provided in the central part of the rotor 42, and the magnet 45 for the sensor is fixed to the outer periphery of the cylindrical part 41b.

The wheel hub 31 is rotatably supported about the wheel shaft 21 through the ball bearing 26 fixed on the wheel shaft 21 and a ball bearing 83 provided on an outer periphery of the flange part 82 of the power transmission member 80. The ball bearings 26 and 83 are located on one lateral side from the body center C.

The wheel hub 31 integrally has a first cylindrical part 31a, a second cylindrical part 31b, and a third cylindrical part 31c each of which becomes larger in diameter in this order from the left-hand side in FIG. 2 (the side on which the brake mechanism 50 is provided). The first cylindrical part 31a is supported on the wheel shaft 21 through the ball bearing 26. The second cylindrical part 31b is supported by the flange part 82 of the power transmission member 80 through the ball bearing 83.

Therefore, the wheel hub 31 can rotate relatively to the power transmission member 80 (therefore, the rotor 42). However, since there is provided the one-way clutch 70 between the wheel hub 31 and the power transmission member 80, the wheel hub 31 can rotate only in one direction relative to the power transmission member 80. To be specific, as seen in the direction shown in FIG. 1 (right-hand side in FIG. 2), the wheel hub 31 can rotate only counterclockwise relatively to the power transmission member 80. Therefore, when the motor 40 is driven and, as seen in the direction shown in FIG. 1 (right-hand side in FIG. 2), when the rotor 42 is driven counterclockwise, torque is transmitted to the wheel hub 31 through the power transmission member 80 and the one-way clutch 70, and the wheel hub 31 (therefore, the front wheel 30) is rotated counterclockwise. Also, while the vehicle is running, even when the motor 40 is stopped and the rotation of the rotor 42 is stopped, during the running of the vehicle, the front wheel 30 (therefore, the wheel hub 31) rotates counterclockwise (idle running). Moreover, according to the present embodiment, in a state where the motor 40 is being driven, when the speed of the vehicle exceeds a predetermined value (40 km/h, for example), the front wheel 30 (therefore, the wheel hub 31) rotates counterclockwise (idle running).

In addition, the-one way clutch 70 is provided between the first cylindrical part 31a of the wheel hub 31 and the power transmission member 80. Moreover, a circlip 32 is provided on an inner-face side of the first cylindrical part 31a of the wheel hub 31 and a circlip 84 is provided on an inner-face side of the power transmission member 80. Therefore, the wheel hub 31 and the power transmission member 80 are prevented from moving in the axial direction. The front wheel 30 is secured to the wheel hub 31 with stud bolts 33.

Between an outer edge of the inner face of the first cylindrical part 31a of the wheel hub 31 and the side collar 27, an oil seal 34 is provided. The third cylindrical part 31c of the wheel hub 31 has the annular end part 31e which extends toward the other lateral side (body-side retainer member 60 side) across the body center C. The annular end part 31e is provided below the annular end part 60e of the body-side retainer member 60 and is overlapped with the annular end part 60e of the body-side retainer member 60. Between the annular end part 31e of the wheel hub 31 and the annular end part 60e of the body-side retainer member 60 (overlapped portion of both the ends), an oil seal 35 is provided. Therefore, water, dust, etc. are less likely to enter the interior of the wheel hub 31 and the body-side retainer member 60 from between the wheel hub 31 and the side collar 27 as well as from between the annular end part 31e of the wheel hub 31 and the annular end part 60e of the body-side retainer member 60.

The brake mechanism 50 comprises a part 51 to be braked that is fixed to the wheel hub 31 and rotates together with the wheel hub 31 (therefore, the front wheel 30) and a braking part 52 brakes rotation of the part 51 to be braked. According to the present embodiment, the part 51 to be braked comprises a brake disc fixed to an outer side face of the wheel hub 31 with bolts 53. The braking part 52 comprises a caliper fixed to the front fork 20R. The braking part 52 and the part 51 to be braked are positioned between the front fork 20L and 20R. A known structure can be adopted for the caliper 52, which comprises a pair of brake pads 54 for pressing the brake disc 51 from both sides and brakes it.

According to the motor-driven vehicle described above, the following effects can be obtained.

Since the wheel hub 31 is rotatably supported on the wheel shaft 21 on the one lateral side alone from the body center C, it is not necessary to rotatably support the wheel hub 31 relative to the body-side retainer member 60.

Therefore, the degree of freedom of the form of the body-side retainer member 60 is increased. As a result, the space through which the wires 43 and 44s for the motor 40 are passed can also be made larger, improving the degree of freedom of the wiring.

On the wheel hub 31, there is provided the annular end part 31e which is opened to the other lateral side on the outer periphery of the perimeter of the rotor 42 of the motor 40 around the wheel shaft 21. The body-side retainer member 60 is provided on the other lateral side. On the body-side retainer member 60, the annular end part 60e opened to the one lateral side is provided on the outer periphery of the perimeter of the rotor 42 of the motor around the wheel shaft 21. The annular end part 31e of the wheel hub 31 and the annular end part 60e of the body-side retainer member 60 are overlapped in the axial direction of the wheel shaft 21. In the overlapped portion, the seal 35 is provided between the wheel hub 31 and the body-side retaining member 60. Since the annular end part 31e of the wheel hub 31 and the annular end part 60e of the body-side retainer member 60 are overlapped in the axial direction of the wheel shaft 21 and, in the overlapped portion, the seal 35 is provided between the wheel hub 31 and the body-side retainer member 60, even if the wheel hub 31 is not rotatably supported relative to the body-side retaining member 60, the motor 40 can be protected by the wheel hub 31 and the body-side retainer member 60.

The rotor 42 of the motor 40 is coupled to the wheel hub 31 through the one-way clutch 70. Therefore, when the rotation of the drive wheel (vehicle speed) is faster than the rotation of the motor 40, the rotation of the wheel hub 31 becomes faster than the rotation of the motor 40. Therefore, the motor 40 does not become a load, and a braking force can be applied to the rotation of the motor 40 at the time of braking.

The power transmission member 80 is coupled to the rotor 42 and, in the outer peripheral portion of the power transmission member 80, the one-way clutch 70 is provided between the power transmission member 80 and the wheel hub 31. Therefore, with respect to the axial direction of the wheel shaft 21, the interlocking mechanism of the rotor 42 and the wheel hub 31 can be structured compactly.

In the portion other than the portion overlapped with the wheel hub 31 in the body-side retainer member 60, the wires (43, 44s) are passed through the body-side retainer member 60. Therefore, the wire insertion part (hole 63) can easily be sealed.

The wires (43, 44s) are passed through the body-side retainer member 60 behind the front fork 20L, and are laid along the front fork 20L. Therefore the wires can easily be protected by the front fork, and are prevented from being broken.

Figure 3:
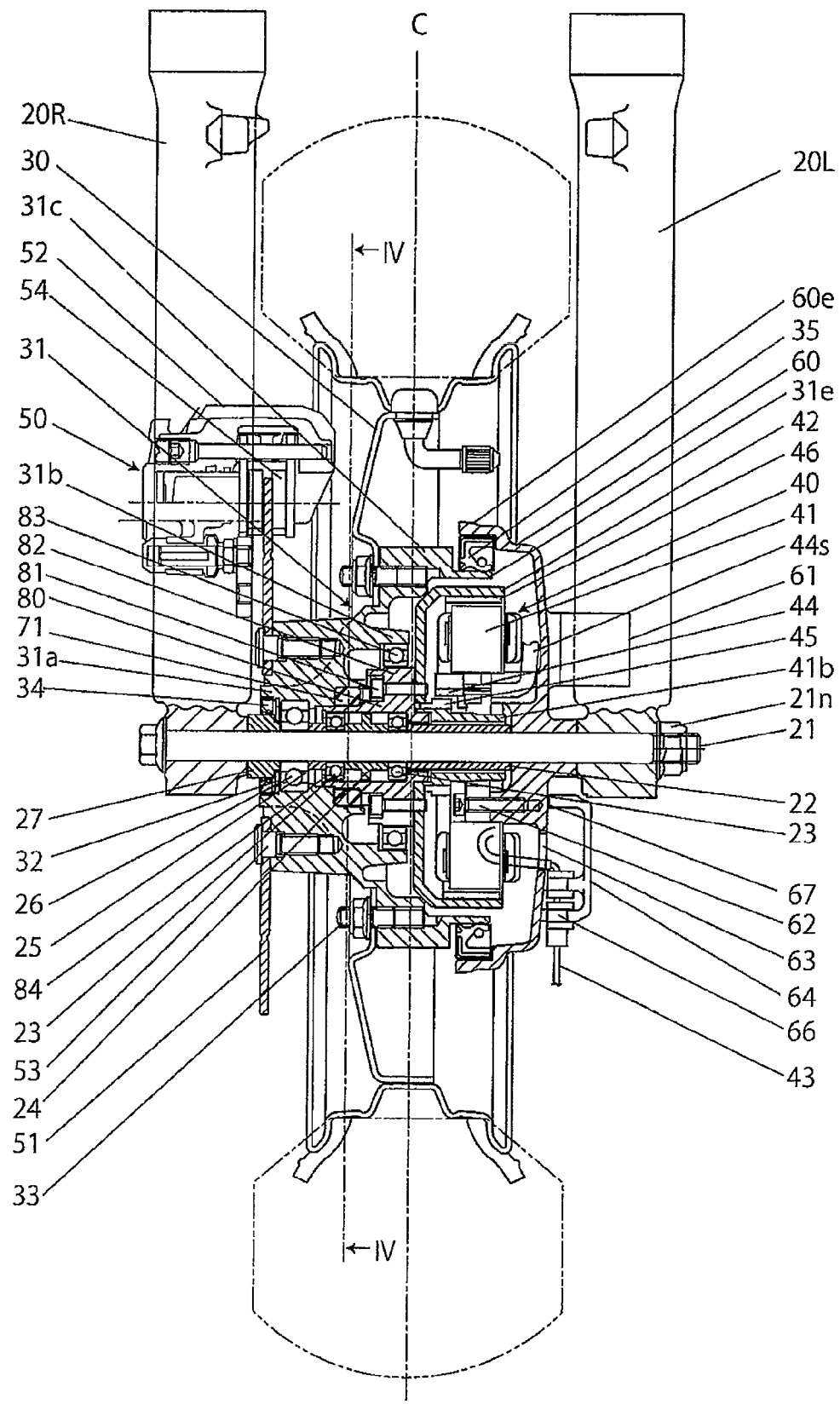
FIG. 3 is a side view showing another embodiment.
Figure 4:
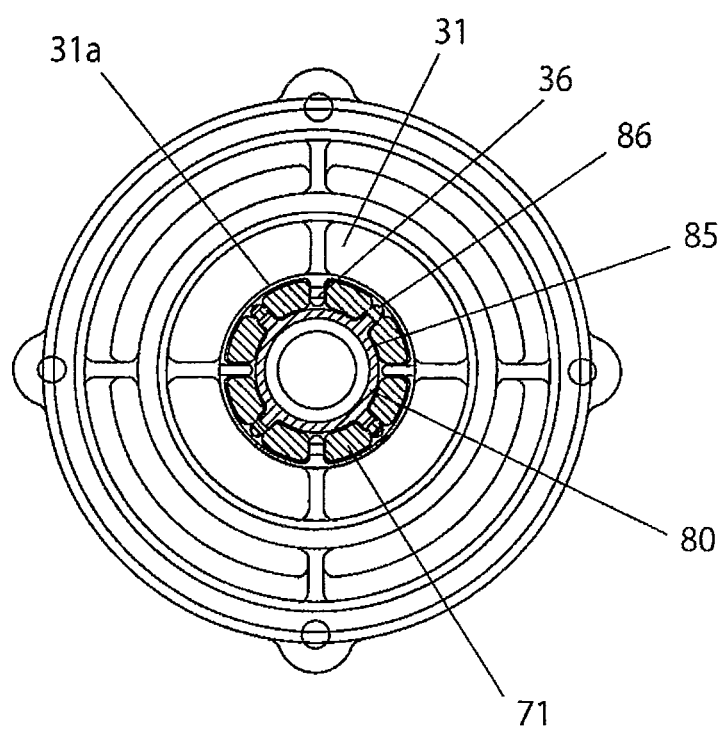
FIG. 4 is a partially omitted sectional view taken along line IV-IV in FIG. 3.

FIG. 3 is a side view showing one embodiment of the motor-driven vehicle according to the present invention, and FIG. 4 is a sectional view taken along line IV-IV in FIG. 3.

The present embodiment differs from the embodiment described earlier in that, instead of the one-way clutch 70, through a damper 71, the power of the rotor 42 is transmitted to the wheel hub 31. However, the rest of the present embodiment is the same as the above embodiment.

As shown in FIG. 4, a torque transmission part 86 extending radially is provided on a cylindrical part 85 of the power transmission member 80. Also, on the inner face of the first cylindrical part 31a of the wheel hub 31, a torque transmission part 36 extending radially is provided. Further, there is provided a rubber damper 71 between the torque transmission parts 86 and 36.

With the above structure, through the damper 71, both the rotor 42 of the motor 40 and the wheel hub 31 (therefore, the front wheel 30) rotate together.

With this embodiment also, the effects of (a), (b), (e), and (f) described earlier can be obtained. Further, the following effect similar to the above effect (d) can be obtained.

(d') The power transmission member 80 is coupled to the rotor 42. In the peripheral portion of the power transmission member 80, the damper 71 is provided between the power transmission member 80 and the wheel hub 31. Therefore, with respect to the axial direction of the wheel shaft 21, the interlocking mechanism of the rotor 42 and the wheel hub 31 can be structured compactly.

Further, according to the present embodiment, the rotor 42 of the motor 40 is coupled to the wheel hub 31 through the damper 71. Therefore, the interlocking mechanism of the rotor 42 and the wheel hub 31 can be structured compactly. Moreover, both the rotor 42 of the motor 40 and the wheel hub 31 (therefore, the front wheel 30) rotate together. Therefore, in addition to the brake mechanism 50, it is possible to adopt regenerative braking.

According to the motor-driven vehicle described above, the following effects can be obtained.

The brake mechanism 50 is provided on the drive wheel 30. As seen from the front of the body, the brake mechanism 50 is arranged on one lateral side from the body center C and the motor 40 is arranged on the other lateral side from the body center C. Therefore, even though the brake mechanism 50 is provided on the drive wheel 30, the weight balance of the right and left of the vehicle can be made favorable.

As seen from the front of the body, the brake mechanism 50 is disposed on one lateral side from the body center C between the front forks 20L and 20R, and the motor 40 is disposed on the other lateral side from the body center C between the front forks. Therefore, it becomes possible to achieve a favorable weight balance about the front forks 20 (L, R) rotatably steered by a driver, improving operability.

The wheel hub 31 is rotatably supported on the wheel shaft 21 on the one lateral side. On the wheel hub 31, the annular end part 31e which is opened to the other lateral side is provided on the outer periphery of the perimeter of the rotor 42 of the motor 40 around the wheel shaft 21. On the other lateral side, there is provided the body-side retainer member 60 which is fixed to the front fork 20L being part of the vehicle body and to which the stator 41 of the motor 40 is fixed. On the body-side retainer member 60, around the wheel shaft 21, the annular end part 60e opened to the one lateral side is provided on the outer periphery of the perimeter of the rotor 42 of the motor. The annular end part 31e of the wheel hub 31 extends to the other lateral side across the body center C. Further, the annular end part 31e of the wheel hub 31 is disposed so as to overlap the annular end part 60e of the body-side retainer member 60 in the axial direction of the wheel shaft 21. Thus, the wheel hub 31 is rotatably supported on the wheel shaft 21 on the one lateral side, and the body-side retainer member 60 to which the stator 41 of the motor 40 is fixed is provided on the other lateral side. Therefore, it becomes easier to arrange the brake mechanism 50 on one lateral side from the body center C and to arrange the motor 40 on the other lateral side from the body center C.

Also, on the wheel hub 31, the annular end part 31e opened to the other lateral side is provided on the outer periphery of the perimeter of the rotor 42 of the motor around the wheel shaft 21. At the same time, on the body-side retainer member 60, the annular end part 60e opened to the one lateral side is provided on the outer periphery of the perimeter of the rotor 42 of the motor about the wheel shaft 21. The annular end part 31e of the wheel hub 31 extends to the other lateral side across the body center C and, in the axial direction of the wheel shaft 21, overlaps the annular end part 60e of the body-side retainer member 60. Therefore, even though the wheel hub 31 is provided on one lateral side and the body-side retainer member 60 is provided on the other lateral side, the motor 40 can be protected by the wheel hub 31 and the body-side retainer member 60.

(d) The brake mechanism 50 is disposed closer to the wheel hub 31 and the motor 40 is disposed closer to the body-side retainer member 60. Therefore, it becomes easier to arrange the brake mechanism 50 on the one lateral side from the body center C and to arrange the motor 40 on the other lateral side from the body center C. At the same time, it becomes possible to shorten the distance between the brake mechanism 50 and the wheel hub 31.

(e) The rotor 42 of the motor 40 is coupled to the wheel hub 31 through the one-way clutch 70. Therefore, when the rotation of the drive wheel (vehicle speed) is faster than the rotation of the motor 40, the rotation of the wheel hub 31 becomes faster than the rotation of the motor 40. Therefore, the motor 40 does not become a load, and a braking force can be applied to the rotation of the motor 40 during braking.

(f) The rotor 42 is coupled to the power transmission member 80 rotatably supported on the wheel shaft 21. Therefore, it is rotatably supported on the wheel shaft 21. Further, the one-way clutch 70 is provided in the outer peripheral portion of the power transmission member 80 between the power transmission member 80 and the wheel hub 31. Therefore, the interlocking mechanism of the rotor 42 and the wheel hub 31 can be made compact in the axial direction of the wheel shaft 21.

With this embodiment also, the effects of (a), (b), (c), and (d) described above can be obtained. Further, the following effect similar to the effect (f) described above can be obtained.

(f') The rotor 42 is coupled to the power transmission member 80 rotatably supported on the wheel shaft 21 and, therefore, is rotatably supported on the wheel shaft 21. The damper 71 is provided in the outer peripheral portion of the power transmission member 80 between the power transmission member 80 and the wheel hub 31. Therefore, in the axial direction of the wheel shaft 21, the interlocking mechanism of the rotor 42 and the wheel hub 31 can be made compact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor-driven vehicle in which a drive wheel having a motor with a stator and a rotor serving as a drive source disposed in a wheel hub is rotatably supported on a wheel shaft between right and left forks, the stator being provided in a body-side retainer member fixed to a vehicle body, the rotor being rotatably supported on the wheel shaft, wiring for the motor being passed through the body-side retainer member, wherein the wheel hub is rotatably supported only on a portion of the wheel shaft that is located on one lateral side of a body center (C), the body center (C) being midway between the right and left forks.

2. The motor-driven vehicle according to claim 1,
wherein in the wheel hub, around the wheel shaft, an annular end part opened to the other lateral side with respect to the one lateral side is provided on an outer periphery of a perimeter of the rotor of the motor;
the body-side retainer member is provided on the other lateral side and, on the body-side retainer member, around the wheel shaft, an annular end part opened to the one lateral side is provided on the outer periphery of the perimeter of the rotor of the motor; and
the annular end part of the wheel hub and the annular end of the body-side retainer member are overlapped in an axial direction of the wheel shaft and, in an overlapped portion, a seal is provided between the wheel hub and the body-side retainer member.

3. The motor-driven vehicle according to claim 1, wherein the rotor of the motor is coupled to the wheel hub through a one-way clutch.

4. The motor-driven vehicle according to claim 2, wherein the rotor of the motor is coupled to the wheel hub through a one-way clutch.

5. The motor-driven vehicle according to claim 3, wherein a power transmission member is coupled to the rotor and the one-way clutch is provided in an outer peripheral portion of the power transmission member between the power transmission member and the wheel hub.

6. The motor-driven vehicle according to claim 1, wherein the wiring is passed through a portion of the body-side retainer member that is separate from other portions of the body-side retainer portion that are overlapped with the wheel hub.

7. The motor-driven vehicle according to claim 1, wherein the wheel hub is rotatably supported on the wheel shaft through a pair of ball bearings located on the one lateral side of the body center (C).

8. The motor-driven vehicle according to claim 3, wherein the wiring is passed through a portion of the body-side retainer member that is separate from other portions of the body-side retainer portion that are overlapped with the wheel hub.

9. The motor-driven vehicle according to claim 4, wherein the wiring is passed through a portion of the body-side retainer member that is separate from other portions of the body-side retainer portion that are overlapped with the wheel hub.

10. The motor-driven vehicle according to claim 1, wherein the wiring is passed through the body-side retainer member behind the front fork and is laid along the front fork.

11. The motor-driven vehicle according to claim 2, wherein the wiring is passed through the body-side retainer member behind the front fork and is laid along the front fork.

12. The motor-driven vehicle according to claim 3, wherein the wiring is passed through the body-side retainer member behind the front fork and is laid along the front fork.

13. The motor-driven vehicle according to claim 5, wherein the wiring is passed through the body-side retainer member behind the front fork and is laid along the front fork.

14. The motor-driven vehicle according to claim 6, wherein the wiring is passed through the body-side retainer member behind the front fork and is laid along the front fork.

15. A motor-driven vehicle in which a drive wheel having a motor with a stator and a rotor serving as a drive source disposed inside a wheel hub is rotatably supported on a wheel shaft between right and left forks,
wherein a brake mechanism is provided on the drive wheel and, as seen from a front of a vehicle body, the brake mechanism is disposed on one lateral side from a body center and the motor is disposed on the other lateral side from the body center,
wherein the wheel hub is rotatably supported only on a portion of the wheel shaft that is located on the one lateral side of a body center (C), the body center (C) being midway between the right and left forks.

16. The motor-driven vehicle according to claim 15, wherein, as seen from the front of the vehicle body, the brake mechanism is disposed on one lateral side from the body center between front forks and the motor is disposed on the other lateral side from the body center between the front forks, and
the wheel hub is rotatably supported on the wheel shaft through a pair of ball bearings located on the one lateral side of the body center (C).

17. A motor-driven vehicle in which a drive wheel having a motor with a stator and a rotor serving as a drive source disposed inside a wheel hub is rotatably supported on a wheel shaft between right and left forks,
wherein a brake mechanism is provided on the drive wheel and, as seen from a front of a vehicle body, the brake mechanism is disposed on one lateral side from a body center (C) and the motor is disposed on the other lateral side from the body center (C),
wherein the wheel hub is rotatably supported on the wheel shaft on the one lateral side and, on the wheel hub, around the wheel shaft, an annular end part opened to the other lateral side is provided on an outer periphery of a perimeter of the rotor of the motor;
on the other lateral side, a body-side retainer member is fixed to the vehicle body and to which the stator of the motor is fixed is provided and an annular end part opened to the one lateral side is provided, in the body-side retainer member, around the wheel shaft on the outer periphery of the perimeter of the rotor of the motor; and
the annular end part of the wheel hub extends toward the other lateral side across the body center so as to overlap the annular end part of the body-side retainer member in an axial direction of the wheel shaft.

18. The motor-driven vehicle according to claim 15, wherein the brake mechanism is disposed closer to the wheel hub and the motor is disposed closer to the body-side retainer member.

19. The motor-driven vehicle according to claim 15, wherein the rotor of the motor is coupled to the wheel hub through a one-way clutch.

20. The motor-driven vehicle according to claim 19, wherein the rotor is rotatably supported on the wheel shaft by being coupled to a power transmission member rotatably supported on the wheel shaft and the one-way clutch is provided in an outer peripheral portion of the power transmission member between the power transmission member and the wheel hub.

* * * * *